W. I. WINCHESTER.
FRUIT GRADER.
APPLICATION FILED APR. 21, 1919.
1,336,059.
Patented Apr. 6, 1920.
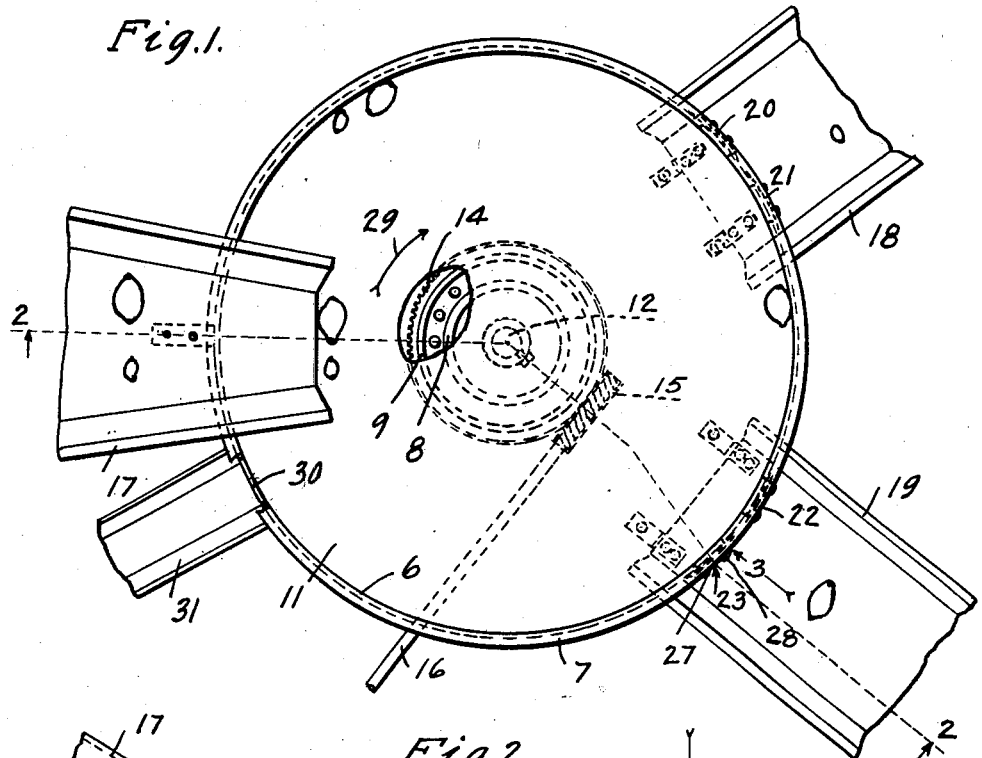
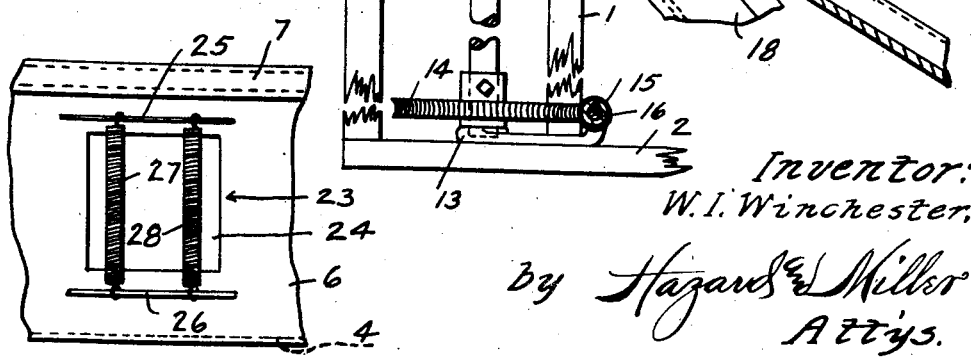
Inventor:
W. I. Winchester,
By Hazard & Miller
Attys.

UNITED STATES PATENT OFFICE.

WILLIAM I. WINCHESTER, OF LOS ANGELES, CALIFORNIA, ASSIGNOR TO LAUGHLIN FRUIT REFINERS, INC., OF LOS ANGELES, CALIFORNIA, A CORPORATION OF CALIFORNIA.

FRUIT-GRADER.

1,336,059.  Specification of Letters Patent.  Patented Apr. 6, 1920.

Application filed April 21, 1919. Serial No. 291,734.

*To all whom it may concern:*

Be it known that I, WILLIAM ISAAC WINCHESTER, a citizen of the United States, residing at Los Angeles, in the county of Los Angeles and State of California, have invented new and useful Improvements in Fruit-Graders, of which the following is a specification.

The object of this invention is to make a continuously operating fruit grader for lemons, oranges, and the like, and the invention consists in the novel features herein shown, described and claimed.

Figure 1 is a fragmentary top plan view of a fruit grader embodying the principles of this invention, as seen looking in the direction indicated by the arrow 1 in Fig. 2.

Fig. 2 is an irregular vertical central section on the line 2—2 of Fig. 1.

Fig. 3 is an enlarged fragmentary elevation, as seen looking in the direction indicated by the arrows 3 in Figs. 1 and 2.

Posts 1 are rigidly mounted upon a base 2 and a platform 3 is rigidly fixed upon the upper ends of the posts 1. A flat metal bottom 4 is mounted upon the platform 3 and has a central opening 5. An annular wall 6 extends upwardly from the periphery of the bottom 4, said wall being substantially straight up and down, and a wired edge 7 is formed at the top of the wall 6. A fixed bearing member 8 is mounted upon the platform 3 centrally in the opening 5 of the bottom 4 and a turn-table bearing member 9 rests upon the bearing member 8. A turn-table 10 is fixed upon the bearing member 9, said turn-table having a conical upper face 11 extending near to the inner face of the wall 6. A shaft 12 is fixed in the turn-table bearing member 9 and extends downwardly into a bearing 13 fixed upon the base 2. A large worm gear 14 is fixed upon the lower end of the shaft 12 and is driven by a worm 15 upon the end of the drive shaft 16. The drive shaft 16 is shown broken away and may be operated from any suitable source of power. A spout 17 leads the oranges, lemons, or the like, to the conical upper face 11 of the turn-table 10 and then the fruit rolls down the conical face 11 to the inner face of the wall 6. Spouts 18 and 19 lead from the opposite side of the platform 3 from the spout 17. Grader openings 20 and 21 lead through the wall 6 to the spout 18, and similar grader openings 22 and 23 lead through the wall 6 to the spout 19. The grader openings 20, 21, 22 and 23 are substantially alike except that they may be adjusted to pass different sizes of fruit.

In Fig. 3 is shown an outside elevation of the grader opening 23. A large rectangular hole 24 is formed through the wall 6. Wires 25 and 26 have their ends bent and fixed through the wall 6 so that one wire is above the hole 24 and the other wire is below the hole, and so that the wires are parallel with each other, and helical springs 27 and 28 have hooks upon their ends and the springs are slightly stretched and the ends hooked over the wires 25 and 26, so that the springs cross the hole 24 in vertical lines. The size of fruit which may pass between the springs 27 and 28 is adjusted by moving the springs to or from each other by sliding the hooks on the wires.

If the turn-table 10 is operated in the direction indicated by the arrow 29, the grader openings 20 and 21 will be adjusted to pass small fruit to the spout 18 and the grader openings 22 and 23 will be adjusted to pass a larger size of fruit to the spout 19. If any fruit is too large to pass the openings 22 and 23 it will remain upon the turn-table until removed by hand, or if preferred a large opening 30 may be made through the wall 6 to pass the over-size fruit to the spout 31.

Any desired number of grader openings may be provided through the wall 6 to produce any desired number of different grades of fruit. The helical springs 27 and 28 form adjustable yielding edges for the grader openings. The differential motion between the turn-table 10 and wall 6 provides means for carrying the fruit from one opening to another until it finds an opening through which it will pass. The inclination of the upper face 11 of the turn-table and the inner face of the wall 6 forms a trough in which the fruit will travel until it finds its outlet.

Various changes may be made without departing from the spirit of my invention as claimed.

I claim:

1. In a fruit grader, a vertical wall having a horizontal hole, and helical springs slidingly mounted in vertical planes to vary the effective size of the hole.

2. A fruit grader comprising an annular vertical wall having a plurality of openings, helical springs slidingly mounted in vertical planes to vary the effective size of the openings, a horizontal conical turn table fitting loosely within the wall and means for operating the turn table.

3. A fruit grader comprising a platform, an annular vertical wall extending upwardly from the platform, a shaft mounted vertically at the axial center of the annular wall, a conical turn-table mounted upon the shaft and fitting loosely within the annular wall, a plurality of grader openings leading through the annular wall from above the turn-table, helical springs slidingly mounted across the openings to vary the effective size of the openings, and means for rotating the shaft.

4. A fruit grader comprising means forming an annular trough, means for providing differential motion between the two sides of the trough; there being grader outlets in one side of the trough; and means forming adjustable yielding sides for the outlets.

5. In a fruit grader, a wall having openings, and means forming adjustable yielding sides for the openings.

6. A fruit grader comprising two bodies forming an annular trough; one body having a plurality of openings; means forming adjustable yielding sides for the openings, and means for moving one body relative to the other.

7. In a fruit grader, an annular trough, means for moving one side relative to the other side; there being fixed openings through one side of the trough for passing a plurality of graded sizes of fruit and a fixed opening for passing the over-sizes; and means forming adjustable yielding edges for the graded openings.

In testimony whereof I have signed my name to this specification.

W. I. WINCHESTER.